Oct. 21, 1930.   W. G. HILDORF ET AL   1,779,166
PISTON
Filed June 18, 1928
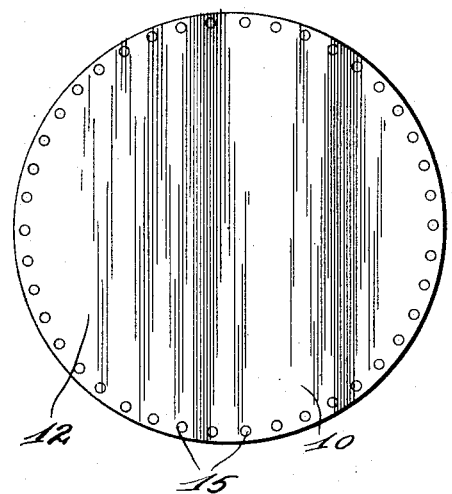
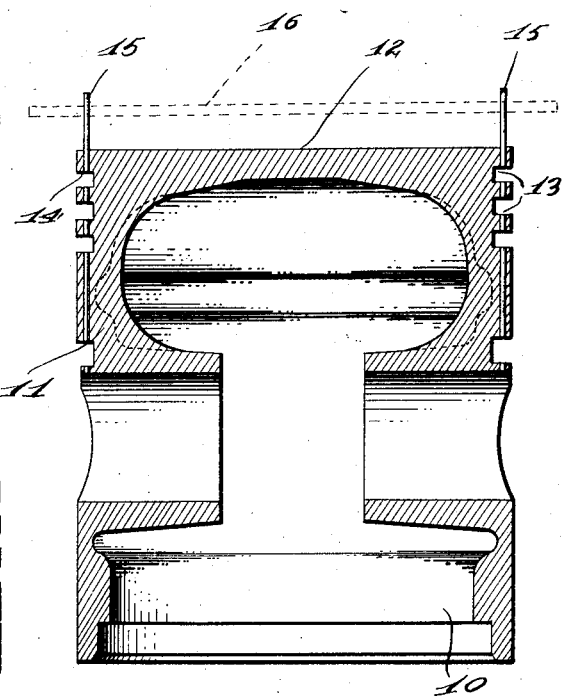
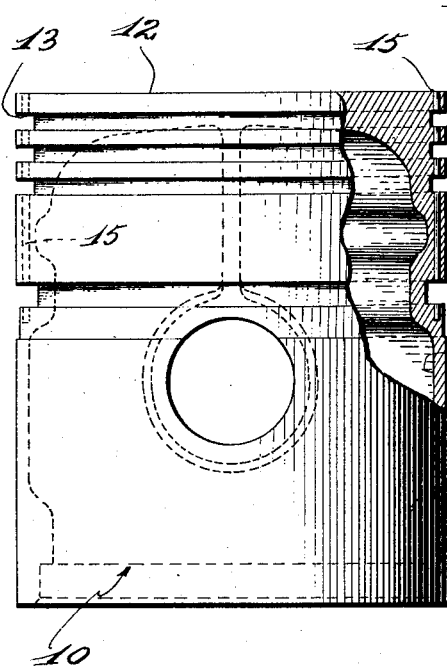
Fig. 2.
Fig. 3.
Fig. 1.
INVENTORS
Walter G. Hildorf
Fabio Sergardi
BY
ATTORNEYS Patented Oct. 21, 1930

1,779,166

UNITED STATES PATENT OFFICE

WALTER G. HILDORF AND FABIO SERGARDI, OF LANSING, MICHIGAN, ASSIGNORS TO REO MOTOR CAR COMPANY, OF LANSING, MICHIGAN, A CORPORATION OF MICHIGAN

PISTON

Application filed June 18, 1928. Serial No. 286,424.

This invention relates to pistons and method of manufacturing the same and more particularly to means for reinforcing or strengthening the ring grooves of the piston.

While the principles of this invention are applicable with equal facility to pistons made of any preferred or desired material the invention finds particular utility in connection with aluminum pistons. Many obvious advantages result from the use of aluminum pistons but several disadvantages have been encountered and are recognized in the use of pistons formed of this or any other relatively soft metal. Aluminum pistons, especially when used in high speed high compression motors have been objectionable in that the ring grooves rapidly become worn and as a consequence enlarged thereby permitting undue movement of the piston rings therein. This not only results in the production of noise but many other obvious objections.

It is therefore, one of the primary objects of this invention to provide means for reinforcing or strengthening the ring grooves of the piston by means of members located therein formed of a material having greater wear resisting properties than the material of which the piston is made. Thus the wear occasioned by the relative movement of the piston ring with respect to the walls of the groove therefor is sustained by this material having greater wear resisting properties whereupon enlargement of the ring grooves is prevented and the resulting objections eliminated. Furthermore, by making the total amount of this material having greater wear resisting properties relatively small as compared to the total amount of material of which the piston is made, the weight of the piston is not unduly increased.

The several objects, advantages and novel details of construction of this invention will be made more apparent as this description proceeds, especially when considered in connection with the accompanying drawings, wherein:

Figure 1 is a sectional elevational view of a piston constructed in accordance with our invention.

Figure 2 is a top plan view thereof, and

Figure 3 is a vertical longitudinal sectional view showing the piston during its course of construction.

Referring now particularly to the drawings wherein like reference characters indicate like parts, it will be noted that there is illustrated a piston 10 including a cylindrical side wall 11 and a top wall or head 12. In constructing the piston it is usually cast and is formed preferably, although not necessarily, of some light metal such as aluminum or the like. As is customary, in piston constructions, a plurality of piston ring grooves 13 are cut or otherwise formed in the wall 11 of the piston. In practice it has been found, that these ring grooves become enlarged by reason of wear occasioned to the top and bottom walls 14 thereof and it is for the purpose of eliminating this disadvantage and objection that the present invention was developed.

To this end we propose casting or otherwise integrally associating a plurality of reinforcing elements 15 with the wall 11 of the piston when the latter is cast. These reinforcing elements 15 are preferably in the form of elongated pin-like members and are formed of a material possessing greater wear resisting properties than the material of which the piston is formed. These reinforcing members or pins 15 may be in the form of pins round cross section, as illustrated, or they may be of any preferred or desired cross sectional and longitudinal configuration. However, it has been found that in practice pin-like members of the type herein illustrated are entirely satisfactory.

A convenient method of properly positioning the reinforcing members 15, during the casting of the piston, consists in passing the desired number of these reinforcing elements through suitably positioned apertures in a positioning fixture 16 whereupon these wires or pin-like members 15 are held in proper spaced relation during the time the metal forming the piston is being poured in the mold. After the metal has hardened the reinforcing elements 15 are in effect integrally cast or associated therewith. The upper protruding ends thereof, as illustrated in Figure 3, may then be cut off.

These reinforcing members 15 extend longitudinally of the piston and through the wall of the piston in which the ring grooves 13 are to be cut. When these grooves are subsequently cut or formed in the piston in any desired or preferred manner the cut is made through the reinforcing members 15 so that the cut ends of these members lie in the planes of the walls 14 of the ring grooves and the combined cross sectional areas of the plurality of members 15 constitute a large proportion of the areas of the upper and lower walls 14 of these grooves. As a consequence of this the walls 14 of the ring grooves are reinforced and strengthened and owing to the greater wear resisting properties of the reinforcing members 15 undue wear to the ring grooves is prevented or minimized. The presence of these members 15 in the wall 11 of the piston will obviously otherwise strengthen and reinforce the piston.

To those skilled in this art it will be apparent that the number, size and shape as well as the relative location of these reinforcing members 15 may be altered as found necessary or expedient. Likewise the relative properties of the materials of which the piston and reinforcing elements are made may also be altered as desired. To this end reservation is made to make such changes in many of the essential and all of the non-essential details of construction of this invention as may come within the purview of the accompanying claims.

What we claim as our invention is:

1. The combination with a piston, of members cast integral with said piston and extending longitudinally thereof inside the wall of the piston in which the ring grooves are cut.

2. The combination with a piston formed of light relatively soft material, of members formed of a material having greater wear resisting properties cast integrally with said piston and extending longitudinally thereof inside the wall of the piston in which the ring grooves are cut.

3. The combination with an aluminum piston, of steel pin-like members cast integrally with said piston and extending longitudinally thereof through the wall of the piston in which the ring grooves are cut.

4. In the method of manufacturing pistons, those steps which consist in embedding longitudinally extending reinforcing members inside a wall of the piston during the casting of the latter and cutting ring grooves in said wall which grooves extend through said reinforcing members.

5. The combination with a piston, of a member cast integrally therewith and arranged wholly within the wall thereof, the said member extending longitudinally of the piston through the wall in which the ring grooves are cut.

6. The combination with a piston, of a reinforcing element cast integrally with said piston, the said reinforcing element being arranged wholly within and extending longitudinally of the wall of the piston in which the ring grooves are cut whereby the ring grooves extend through said element.

In testimony whereof we affix our signatures.

FABIO SERGARDI.
WALTER G. HILDORF.